United States Patent [19]
Fried

[11] Patent Number: 4,618,223
[45] Date of Patent: Oct. 21, 1986

[54] THERMOELECTRIC ACTUATOR FOR MIRROR ADJUSTMENT
[75] Inventor: Lawrence Fried, Palo Alto, Calif.
[73] Assignee: The United States of America as represented by the Secretary of the Navy, Washington, D.C.
[21] Appl. No.: 537,194
[22] Filed: Sep. 29, 1983
[51] Int. Cl.⁴ .............................................. G02B 7/18
[52] U.S. Cl. .................................................. 350/611
[58] Field of Search ........................ 350/310, 295, 611
[56] References Cited
U.S. PATENT DOCUMENTS

| 1,951,404 | 3/1934 | Goddard | 126/270 |
|---|---|---|---|
| 3,322,483 | 5/1967 | Jones | 350/295 |
| 3,808,553 | 4/1974 | Locke et al. | 331/94.5 |
| 3,942,880 | 3/1976 | Zeiders | 350/310 |
| 4,021,754 | 5/1977 | Colao | 331/94.5 |
| 4,091,274 | 5/1978 | Angelbeck et al. | 250/201 |
| 4,105,281 | 8/1978 | Johnson et al. | 350/6.5 |

Primary Examiner—Jon W. Henry
Attorney, Agent, or Firm—R. F. Beers; C. D. Curry; G. L. Craig

[57] ABSTRACT

A thermoelectric apparatus for adjusting the shape or position of a mirror by application of pressure from a device which changes dimensionally with changes in temperature. The device is a metallic or non-metallic generally tubular member having a heat pump mounted thereon which in turn has a thermal connection to a controllable heat source. A temperature sensor is also mounted on the device and both the temperature sensor and the heat pump are electrically connected to a controller.

5 Claims, 2 Drawing Figures

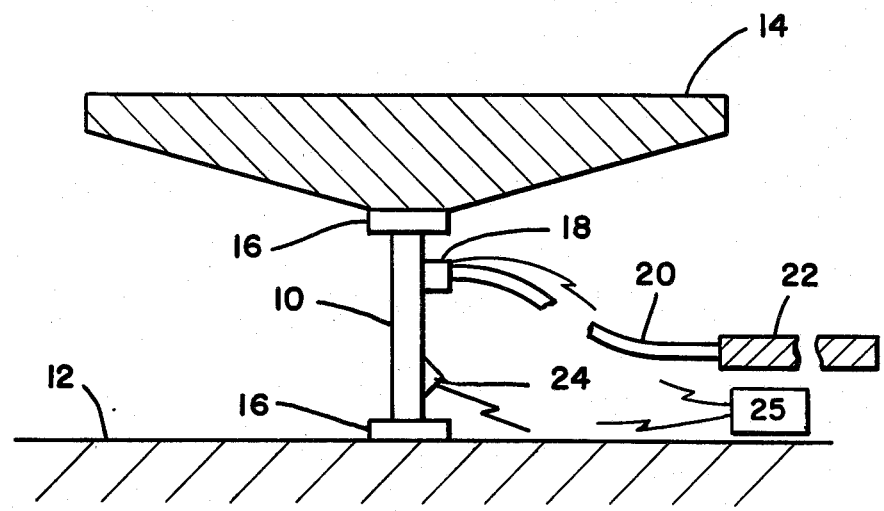
FIG _ 1
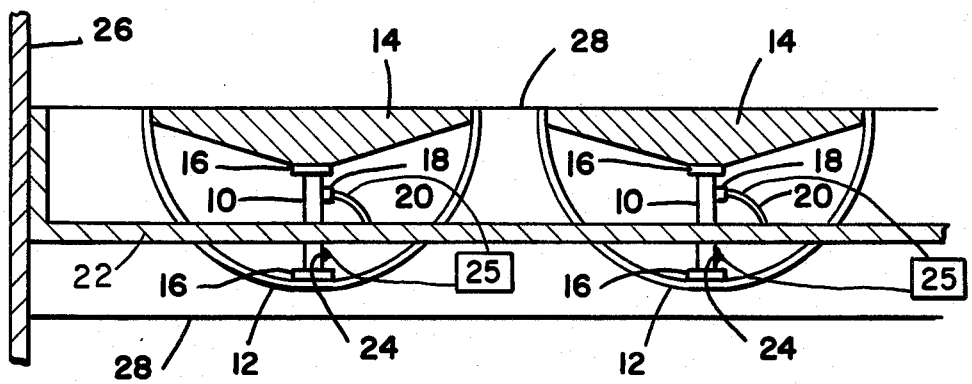
FIG _ 2

THERMOELECTRIC ACTUATOR FOR MIRROR ADJUSTMENT

BACKGROUND OF THE INVENTION

1. Field of the Invention

The invention relates to a device for changing the shape or position of a mirror. Specifically, the invention relates to a device for changing the shape or position of a mirror by changes in temperature.

2. Description of Prior Art

The adjustment of mirrors by control of their shape or position is important in the operation of solar energy devices, lasers, tracking and communication devices aboard spacecraft and the like. Generally, methods of adjustment are electromechanical, acting on a system of rods in some manner, and have limited force capability. Such conventional techniques can generate considerable amounts of waste heat, especially when used without brakes, and may require high voltages. Additionally, the relatively complex rod arrays of conventional systems are generally not very rugged and may have limited utility where heavy mechanical loading, such as high-g forces, can be expected.

The present invention provides an apparatus having capability for large actuation force, insensitivity to heavy mechanical loading, minimum heat generation and smoother operation than response limited mechanical systems. The present invention further provides very precise positioning accuracy compared to conventional systems although it may not be suitable where large, very rapid adjustments are required.

SUMMARY OF THE INVENTION

Briefly described is a thermoelectric apparatus for adjusting the shape or position of a mirror by application of pressure from a device which changes dimensionally with changes in temperature. The device is a metallic or non-metallic generally tubular member having a heat pump mounted thereon which in turn has a thermal connection to a controllable heat source. A temperature sensor is also mounted on the device and both the temperature sensor and the heat pump are electrically connected to a controller which controls the heat exchange between the heat pump and the heat source.

A primary object of invention is to provide an apparatus for the thermoelectric control and adjustment of at least one mirror.

Another object of invention is to control the adjustment of at least one mirror by an actuating tube connected to the mirror wherein the dimensions of the actuating tube are thermoelectrically controlled.

Other objects, features and advantages of the invention will become apparent to those skilled in the art in light of the following description and drawings.

BRIEF DESCRIPTION OF THE DRAWINGS

FIG. 1 is a simplified schematic of the preferred embodiment.

FIG. 2 is a simplified schematic of a series of mirrors connected to a common heat sink/source and adjusted by pressure applied centrally to the mirrors.

DESCRIPTION OF THE PREFERRED EMBODIMENT

Referring to FIG. 1, a schematic of the essential features of the preferred embodiment is shown. The actuating member 10 is generally tubular and is connected between some structural reaction member 12 and the mirror 14 to be actuated by connecting devices 16 which may be thermally isolating. At least one thermoelectric element 18 is attached to the actuator 10 and has, in turn, a flexible thermal connection 20 to a thermal heat source/sink 22. Although FIG. 1 shows the actuator 10 positioned to apply a central force to the mirror 14, it may equally well be positioned to apply an edge force or moment. A temperature sensor 24 is also located on the actuator 10 with connections to a remote controller 25 which in turn is electrically connected to the thermoelectric element 18. Therefore, error signals for operation of the controller 25 may be derived from the temperature sensor 24 attached to the actuator 10 or from an external source such as a mirror surface distortion sensor. The controller 25 has some memory capacity as well as capability for simple logic operations.

Referring to FIG. 2, a schematic is shown for mounting a series of mirros 14 having thermoelectric actuators 10 connected to the mirror centers for adjustment. Here, a single radiator 26 supplies heat to the common heat sink/source 22, e.g., a variable conductance heatpipe. In operational use, to prevent errors from uncontrolled radiation impinging the structures other than the mirror faces as well as to control heat flow from the actuators to the outside, a flexible, multi-layer material 28 encloses the apparatus. The material has openings for the mirrors in the same plane as the mirror surfaces.

In operation, the thermoelectric element 18 will supply heating and cooling as necessary upon command from the controller 25 to cause expansion/contraction of the actuator 10 and subsequent movement and/or distortion of the mirror 14 to which it is connected. Initially, each mirror 14 is calibrated to achieve a desired position/distortion and the temperature of the actuator 10 noted necessary to maintain the desired position/distortion, hereinafter referred to as the set point. The set point for a given actuator is then stored in the associated controller, which has capability for handling simple logic operations, and the controller will then maintain the actuator at the desired temperature based on error signals received from the associated temperature sensor or an external source. As the set point is a relative rather than absolute value, inaccuracies in components such as A/D converters will be factored out.

The temperature of the thermal heat sink/source 22 is closely controlled since it is an electrically-controlled, variable-conductance heat-pipe in the preferred embodiment. Two modes of operation of the thermal heat sink/source are possible when a plurality of actuators are connected to it. The thermal heat sink/source may be set to the temperature of one particular actuator. Alternatively, in a mode consuming less power, the thermal heat sink/source may be set to the approximate center temperature of all the actuators to which it is connected. The lower power consumption results from the fact that in the preferred embodiment, all the mirrors will have approximately the same curvature and hence approximately the same temperature requirement from each controller. Temperature fluctuations of the thermal heat sink/source do not affect an actuator since the temperature of a thermoelectric element and the associated actuator is controlled by the associated controller.

Distortion of a mirror from other than the actuator force can occur from several sources: (1) once-only distortions prior to deployment resulting from ground alignment, forces occuring during deployment or off-gassing of graphite-epoxy structures; (2) slow structural changes such as creep, stress relief or long-term changes in graphite-epoxy structures after off-gassing; (3) thermal distortion. The present invention can compensate for the first two sources of distortion by weekly adjustments at most and the last source of distortion will require no compensation if the temperature of the entire structure holding the mirror array is controlled. Where structure temperature control is not done, compensation by the present device must be performed at frequent intervals varying from hour-to-hour and longer depending on changes in the environment since the structure will distort with thermal changes causing subsequent misalignment of the mirrors. The temperatures of the actuators are continually heater controlled to preserve their accuracy. Since structure and mirror temperatures can be expected to traverse a temperature range of $-70°$ F. to $+100°$ F. the need for recalibration of the mirrors decreases markedly when the structure is temperature-controlled, but even where such control is not done, the present invention is a reliable, relatively inexpensive and relatively straight-forward technique for highly accurate mirror control. Controllers as described above for the thermoelectric elements are extremely rugged and reliable and commonly have MTBF's of 35 years or more. Further, two controllers can be attached to each actuator to eliminate any possibility of single-point failure such as is found in conventional non-thermoelectric controlled systems. An example of the control and resolution possible with the present invention are given below.

EXAMPLE

The requirement is to effect a movement of 100 μm (3937μ inches) in one minute with a positioning accuracy 2.8 μm using a 10" aluminum tube having 0.5 in OD and 0.02 in walls. Assume a typical controller capable of supplying 18.4 watts.

$$\Delta T = \frac{3937 \text{ in} * 10^{-6}}{(12 * 10^{-6} \text{ in/in/°F.})(10 \text{ in})} = 32.8° \text{ F.} = 18.2° \text{ C.}$$

required to move the mirror.

Assuming ±0.2° C. temperature control, $$L = \frac{100 \text{ μm}}{18.2° \text{ C.}} * \pm 0.2° \text{ C.} = \pm 1.10 \text{ μm} = \text{positioning accuracy}$$

Response time = $\frac{\text{(thermal mass of actuator)}(\Delta T)}{\text{(power required for } \Delta T)}$ =

$$\frac{(0.00785 \text{ BTU/°F.})(18.2° \text{ C.})(1.8° \text{ F./°C.})(3600 \text{ sec/hr})}{(18.4 \text{ watts})(3.413 \text{ BTU/watt-hour})} =$$

14.7 seconds

Faster response times may be achieved using controllers having higher power capability. The converse is true where lower power is used.

What is claimed is:

1. A device for thermoelectrically adjusting a mirror in a plane normal to the mirror surface comprising:
   (a) a support structure for said mirror;
   (b) at least one generally tubular member having one end attached to a predetermined location on the underside of said mirror, said tubular member changing dimensionally with temperature such as to apply pressure to said location on said mirror;
   (c) a pair of thermally isolating connectors operably connecting an end of said tubular member opposite said mirror to said support structure;
   (d) a thermoelectric element mounted on said tubular member;
   (e) a variable-conductance heat pipe operably connected between a heat sink/source and said thermoelectric element; and
   (f) means for determining the temperature of said tubular member, said means for determining transmitting an output signal.

2. A device for thermoelectrically adjusting a mirror in a plane normal to the mirror surface comprising:
   (a) a support structure for said mirror;
   (b) means for applying pressure to a predetermined location on the underside of said mirror;
   (c) a pair of connectors operably connecting said means for applying between said mirror and said support structure; and
   (d) means for changing the temperature of said means for applying operably connected to said means for applying such that said means for applying selectively supplies pressure to said mirror, said means for changing including:
      a thermoelectric element mounted on said means for applying;
      means for supplying variable heat from a sink/source;
      means for connecting said thermoelectric element to said means for supplying;
      means for determining the temperature of said means for applying, said means for determining having an output signal; and
      means for controlling said heat from said means for supplying, said means for controlling receiving said output signal from said means for determining and having an output signal to said means for supplying.

3. A device for thermoelectrically adjusting a mirror as described in claim 1 wherein said means for applying is a generally tubular member that changes dimensionally with changes in temperature.

4. A device for thermoelectrically adjusting a mirror as described in claim 2 wherein said connectors are thermally isolating connectors.

5. A device for thermoelectrically adjusting a mirror as described in claim 2 wherein said means for supplying is a variable-conductance heat pipe.

* * * * *